Figure 1:
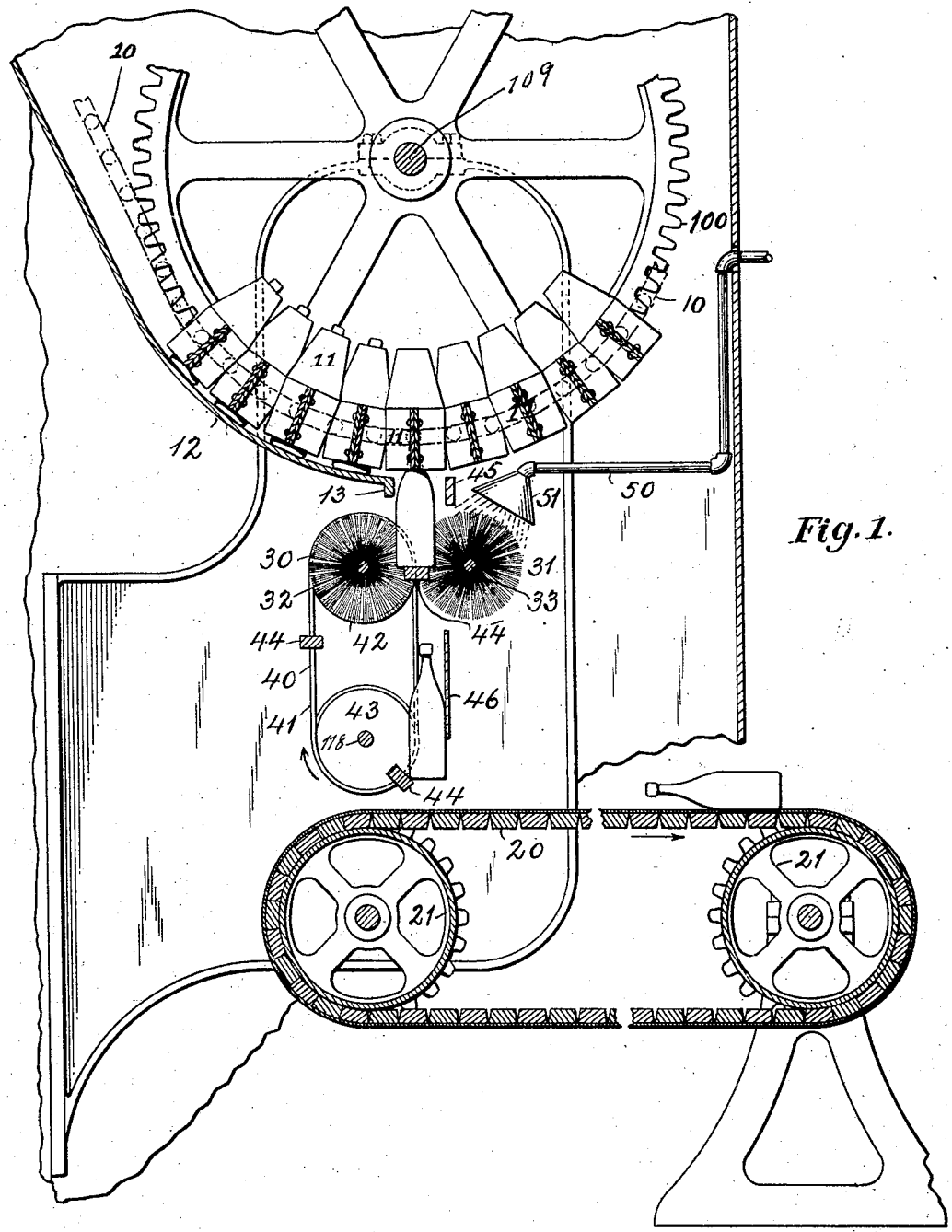

No. 852,127. PATENTED APR. 30, 1907.
C. H. LOEW.
BOTTLE WASHING MACHINE.
APPLICATION FILED JAN. 11, 1906.

2 SHEETS—SHEET 1.

Attest:
May Hughes
Alan McDonnell

Charles H. Loew, Inventor:
by William R. Baird,
his Atty.

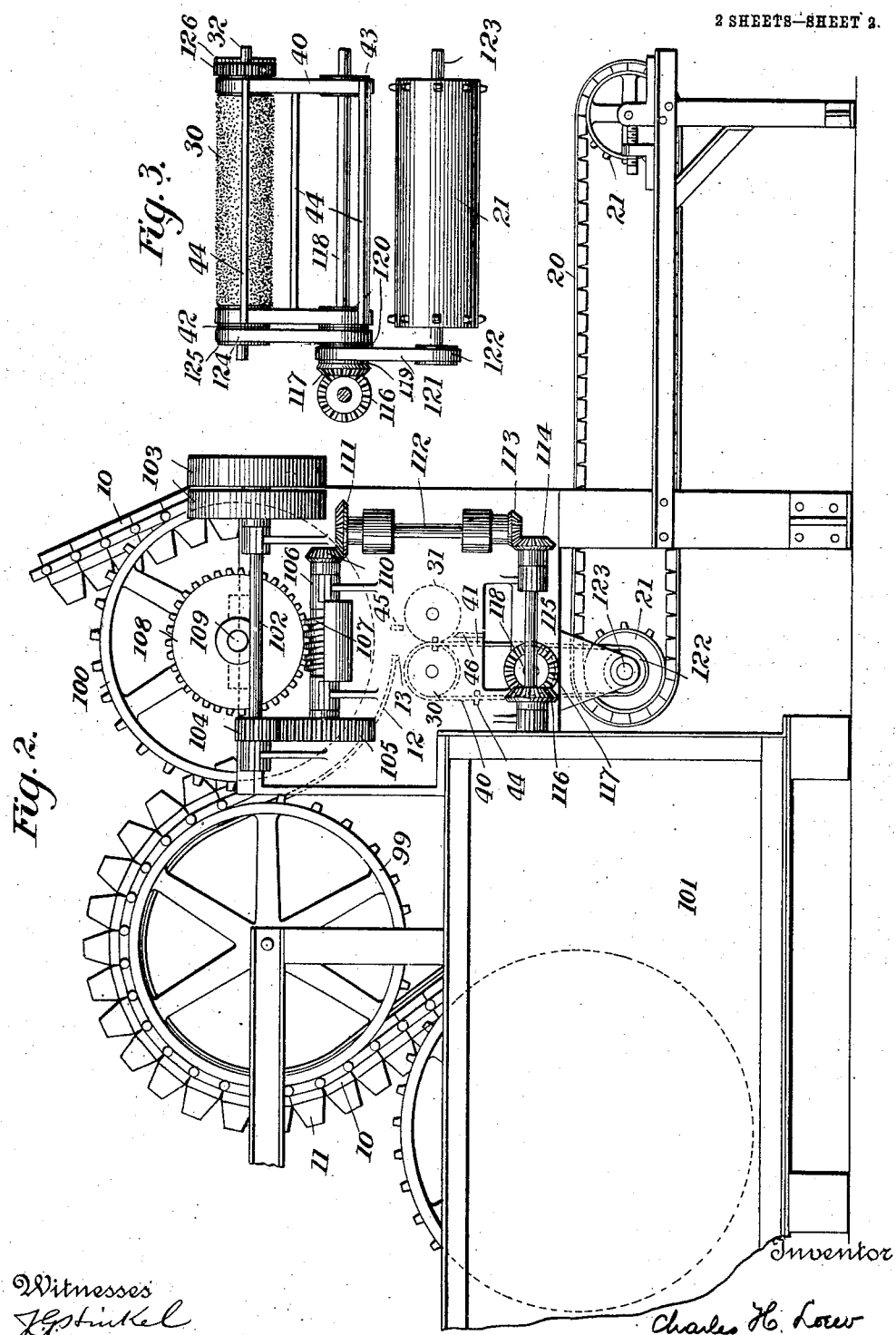

UNITED STATES PATENT OFFICE.

CHARLES H. LOEW, OF LAKEWOOD, OHIO.

BOTTLE-WASHING MACHINE.

No. 852,127.      Specification of Letters Patent.      Patented April 30, 1907.

Application filed January 11, 1906. Serial No. 295,543.

*To all whom it may concern:*

Be it known that I, CHARLES H. LOEW, a citizen of the United States, residing at Lakewood, in the county of Cuyahoga and State of Ohio, have invented certain new and useful Improvements in Bottle-Washing Machines, of which the following is a specification.

This invention relates to bottle washing machines and particularly to that class of machines comprising an endless carrier by means of which bottles are conveyed through a series of solutions and automatically discharged from the carrier at the end of their travel.

In machines of this class, of which an example is found described in Letters Patent of the United States No. 797,298, issued to me August 15th, 1905, at the discharge end of the conveyer, the bottles are caused to drop between rows of revolving brushes, which may or may not be wet, in order that they may be finally externally cleansed.

It has been found by experience that, under such circumstances, the bottles acted upon by gravity moved too rapidly between the rows of brushes, so that the latter did not have a proper opportunity to clean their external surfaces.

The object of my invention is to provide means whereby the movement of the bottles between the rows of brushes is governed so that the bottles are kept in contact with the brushes a sufficient length of time to permit of the thorough cleansing of their external surfaces, while they are still allowed to be discharged by gravity.

In the drawings:—Figure 1 is a vertical longitudinal section through the discharge end of a bottle washing machine, showing my present improvements. Fig. 2 is a side elevation, showing a portion of the tank and bottle conveyer-chain and a suitable driving mechanism for the several parts. Fig. 3 is a detail front view showing a suitable driving mechanism for the brush.

10 designates the endless conveyer which moves, as usual, around a suitably arranged series of sprocket wheels, two of which are indicated at 99 and 100, or other suitable supporting and driving means therefor, and travels through a tank, the end of which is indicated at 101, which may contain as usual, different soaking solutions through which the bottles are successively conveyed with transverse rows of bottle pockets 11 which are finally brought downward toward the point of discharge contiguous to the surface of a guard 12, which terminates at the point 13 so as to provide thereat a bottle receiving space through which the bottles are permitted to drop by gravity. In Fig. 1 a bottle is shown in such position.

Arranged below the discharge end of the conveyer is a horizontal belt conveyer 20 of usual form and which is moved in the direction indicated by the arrow by any suitable means as sprocket wheels 21, 21. This conveyer is designed to receive the bottles after they have passed through the brushes presently to be described and to convey them to the filler or to any other suitable place in the bottling house as may be most convenient.

Above the horizontal belt conveyer 20 and below the discharge end of the bottle washing apparatus are arranged the brushes 30, 31. These are mounted upon shafts 32 and 33, and are caused to revolve by means of belts, or in any other suitable way.

In the immediate vicinity of the brushes, there is arranged a vertically placed conveyer 40 comprising a belt 41, adapted to revolve around suitable supports, as the pulleys 42 and 43, and provided at suitable intervals with transverse slats or supports 44, 44. Arranged at suitable positions in proximity to the belt 41 are guards 45, 46, adapted to prevent the bottles from becoming displaced in their descent from the bottle pockets to the belt conveyer, the guard 45 guiding the bottles toward the brushes, and the guard 46 preventing its premature fall after passing through the brushes.

The conveyer 40 is made of such a length and the cross supports 44 are placed at such points thereon and the movement of the belt 41 is so timed, in harmony with the movement of the conveyer 10 and the rate of rotation of the brushes 30, 31, that a bottle falling from the main conveyer is arrested in its fall by one of the supports 44 and is supported thereby until it passes downward between the brushes 30, 31, and out of reach of the bottle next in succession discharged from the conveyer, which bottle is in turn arrested in its downward movement by the support 44 next in succession upon the belt 41. As the belt 41 continues to move in the direction indicated by the arrow, the slats or supports 44, when they reach the bottom of the pulley 43, are turned and thus allow the bottle supported thereon to slip down by gravity upon the apron of the belt conveyer 20, the guard 46 preventing it from falling too far and gently guiding it downward.

Arranged in convenient proximity to the brushes and to the conveyer 40 is placed a sprinkling mechanism consisting of a pipe 50 provided with a rose 51 and supplied with water from a source of supply (not shown) and from which rose are discharged jets of water upon the brushes and bottles.

A suitable driving mechanism for the moving parts is shown in the drawings, wherein it will be seen that the main operating shaft 102, is provided at one end with fast and loose pulleys 103, 103 adapted to be engaged by a driving belt (not shown). The other end of the shaft 102 has a pinion 104 which meshes with a gear 105 mounted on a countershaft 106. This countershaft has a worm 107 which engages a gear 108 mounted on the shaft 109 of the gear 100 which drives the conveyer 10. The countershaft 106 also has a bevel gear 110 which intermeshes with a similar gear 111 carried by one end of a shaft 112. The other end of this shaft 112 also has a bevel gear 113 which engages a similar gear 114 on the contiguous end of a shaft 115. The other end of this shaft 115 has a bevel gear 116 which is intermeshed with a similar gear 117 on a shaft 118. This shaft 118 has, in addition to the pulleys 43 hereinbefore referred to, a plurality of pulleys as 119 and 120. The first of these pulleys (119) is connected by a belt 121 with a pulley 122 on the end of the shaft 123 of the sprocket wheel 21 which drives the conveyer 20. The second of these pulleys (120) is connected by a belt 124 with a pulley 125 on the end of the brush shaft 32 whereby the brush 30 derives motion from the shaft 118. The conveyer 40 travels as already stated over the pulleys 42 and 43, the former of which are, as stated, mounted on the shaft 118. The brush 31 derives its motion from the shaft 32 by means of intermeshing gears 126 and 127 on the brush shafts 32 and 33 in Fig. 3.

While the foregoing constitutes a suitable driving mechanism for the moving parts, it is to be understood that the invention is not restricted thereto.

What I claim as new is:

1. In a machine of the class described, the combination with a brushing mechanism, and a main bottle-conveyer adapted to discharge the bottles toward the brushing mechanism, of an endless traveling second conveyer arranged to receive the bottles from the main conveyer and to carry the same past the brushing mechanism, and means for controlling the discharge of the bottles from the main conveyer and guiding the same to the second mentioned conveyer comprising a guard having a bottle receiving space between the first and second conveyers.

2. In a machine of the class described, the combination with a pair of brushes, and a main bottle-conveyer adapted to discharge the bottles toward the brushes, of a guard having a bottle receiving space alined with the space between the brushes and adapted to guide the bottles thereto, and an endless traveling conveyer provided with bottle holders and arranged to have one of the runs travel beneath said space and between the brushes.

3. In a machine of the class described, the combination with a brushing mechanism, and a main bottle conveyer adapted to discharge the bottles toward the brushing mechanism, of an endless traveling second conveyer arranged to receive the bottles from the main conveyer and to carry the same past the brushing mechanism, and a guard arranged outside the plane of the second conveyer and adapted to prevent the premature discharge of the bottles therefrom.

4. In a machine of the class described, the combination with a brushing mechanism, and a main bottle conveyer adapted to discharge the bottles toward the brushing mechanism, of an endless traveling second conveyer arranged to receive the bottles from the main conveyer and to carry the same past the brushing mechanism, a third conveyer arranged to receive the bottles from said second conveyer, and a guard arranged outside the plane of the second conveyer and adapted to prevent the premature discharge of the bottles from the second conveyer to the third conveyer.

5. In a machine of the class described, the combination with a pair of brushes, and a main bottle conveyer adapted to discharge the bottles toward the brushes, of an endless-traveling second conveyer provided with bottle holders and arranged to receive the bottles from the main conveyer and having one of its runs in the space between the brushes, and guard means arranged outside the plane of the second conveyer and adapted to guide the bottles thereto and prevent their premature discharge therefrom.

6. In a machine of the class described, the combination with a pair of brushes, and a main bottle conveyer adapted to discharge the bottles toward the brushes, of an endless-traveling second conveyer provided with bottle holders and arranged to receive the bottles from the main conveyer and having one of its runs in the space between the brushes, guard means arranged outside the plane of the second conveyer and adapted to guide the bottles thereto and prevent their premature discharge therefrom, and a third conveyer arranged to receive the bottles from the second conveyer.

7. In a machine of the class described, the combination with a main conveyer having bottle pockets which open downward at the place of discharge therefrom, and a brushing mechanism arranged beneath said place of discharge, of an endless traveling second bottle conveyer which travels close to said place of discharge and past the brushing mechanism, means between the main conveyer and brushes for guiding the bottles from the former to the second conveyer, a third conveyer adapted to receive the bottles from the second conveyer and a guard arranged between the brushing mechanism and third conveyer and adapted to prevent the premature discharge of the bottles from the second conveyer.

8. In a machine of the class described, the combination with a main conveyer having bottle pockets which open downward at the place of discharge therefrom, and a pair of brushes arranged beneath said place of discharge, of an endless traveling second bottle conveyer which travels close to said place of discharge and with one of its runs between the pair of brushes, means between the main conveyer and brushes for guiding the bottles from the former to the second conveyer, a third conveyer adapted to receive the bottles from the second conveyer and a guard arranged between the brushing mechanism and third conveyer and adapted to prevent the premature discharge of the bottles from the second conveyer.

In testimony whereof I affix my signature in presence of two witnesses.

CHARLES H. LOEW.

Witnesses:
MAY HUGHES,
ALAN McDONNELL.